W. J. BUSSE.
VEHICLE WHEEL.
APPLICATION FILED DEC. 6, 1915. RENEWED AUG. 23, 1916.
1,222,356.
Patented Apr. 10, 1917.
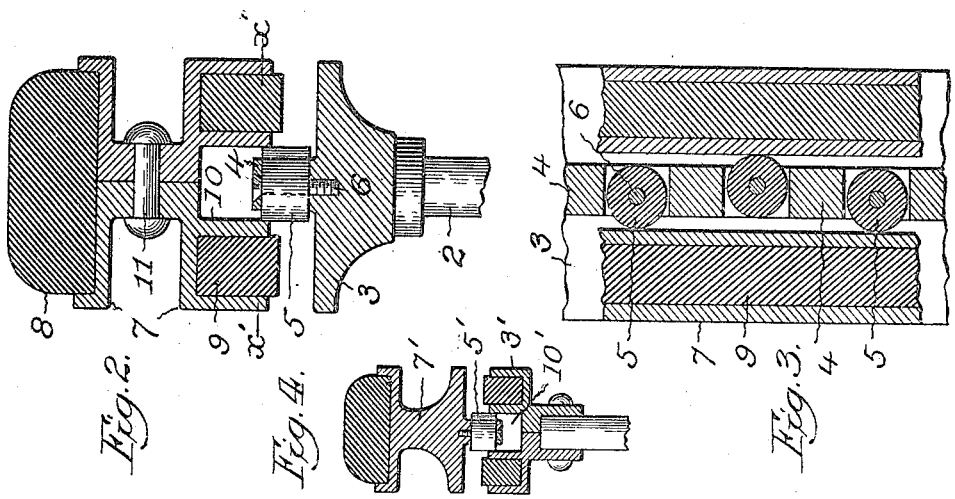
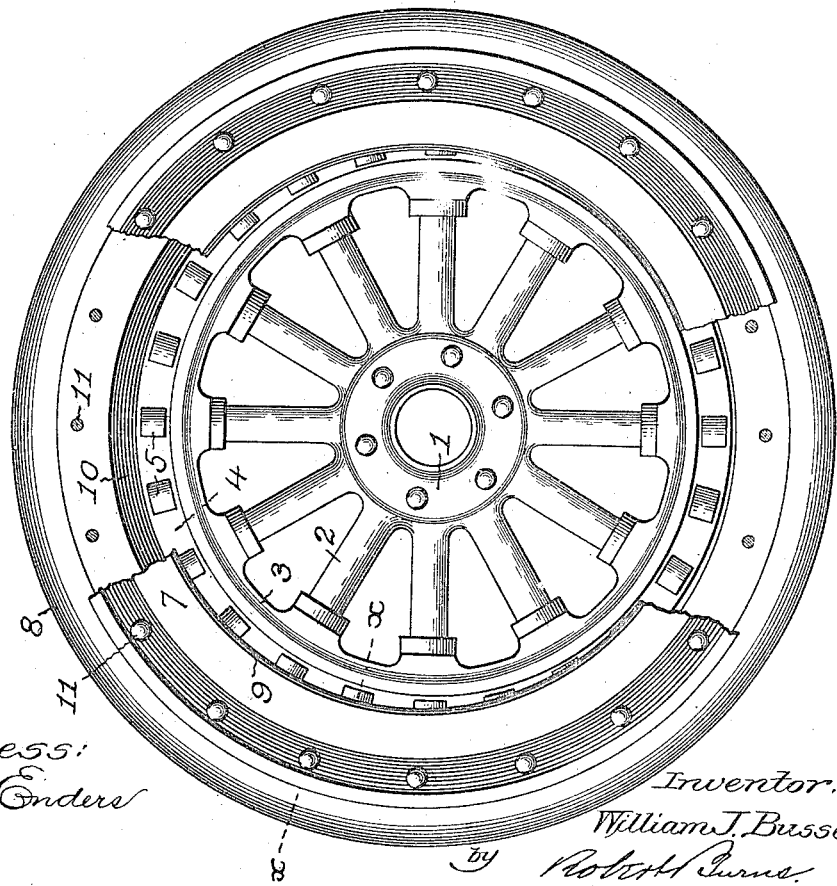
Witness:
John Enders
Inventor:
William J. Busse,
by Robert Burns
Atty.

UNITED STATES PATENT OFFICE.

WILLIAM J. BUSSE, OF CHICAGO, ILLINOIS.

VEHICLE-WHEEL.

1,222,356. Specification of Letters Patent. Patented Apr. 10, 1917.

Application filed December 6, 1915, Serial No. 65,221. Renewed August 23, 1916. Serial No. 116,546.

*To all whom it may concern:*

Be it known that I, WILLIAM J. BUSSE, a citizen of the United States of America, and a resident of Chicago, in the county of Cook, State of Illinois, have invented certain new and useful Improvements in Vehicle-Wheels, of which the following is a specification.

This invention relates to that class of vehicle wheels in which an annular tread member is associated in eccentric relation to an inner and smaller wheel member to provide a track for such inner wheel member.

And the present improvement has for its object to provide a structural formation and association of parts, whereby the outer annular and inner wheel members are slidingly connected together in a substantial manner which admits of a limited independent sliding movement between the members and which at the same time avoids liability of lateral friction and binding of the parts in actual use.

Another object is to provide a simple and efficient annular track surface between the respective wheel parts, adapted to provide effective traction contact in the coöperation of the wheel parts in actual use. All as will hereinafter more fully appear.

In the accompanying drawings:—

Figure 1, is an elevation of a wheel structure embodying the present improvement, parts of the structure being removed to illustrate the internal association of parts.

Fig. 2, is an enlarged detail section on line x—x, Fig. 1.

Fig. 3, is a similar view on line x'—x', Fig. 2.

Fig. 4, is a detail transverse section, illustrating a modified wheel structure.

Similar reference numerals indicate like parts in the several views.

As illustrated in the drawings, the inner wheel member of the wheel structure comprises the usual central hub 1, intermediate center or spokes 2, and a track rim or annulus 3, which track rim 3, in the preferred form of the present invention illustrated in Figs. 1 and 2, has a plane periphery, and midway the width of said periphery an annular outstanding fin or web 4 formed with a series of transverse openings in which are arranged a series of radially disposed friction rollers 5.

6 designate the pivot pins or bolts by which the aforesaid friction rollers 5 are journaled in the series of transverse openings aforesaid, and to such end said pivot bolts are disposed radially as shown.

7 designates the outer annular member of the wheel structure, having an internal diameter greater than the outer diameter of track rim 3 of the inner wheel member aforesaid, so that when the respective outer and inner wheel members are assembled in working condition, said members will have eccentric relation to each other with the lower peripheral portion of the inner wheel member having bearing engagement with the lower portion of the inner circular face of the outer wheel member or annulus 7, as illustrated in Fig. 1.

The periphery of outer annular wheel member 7, is provided with an annular outer tread structure 8 of any usual wear resisting material, and held in place in any ordinary and suitable manner. While the inner circular face of said member 7 is of a plane form and preferably comprises a pair of annular inserts 9 of a suitable wear resisting and friction producing material, and arranged in lateral spaced relation to provide circular track surfaces for the respective lateral spaced side portions of the periphery of the track rim 3 of the inner wheel member aforesaid.

10 designates an annular recess or cavity formed in the inner circular face of the outer wheel member 7, and between the annular inserts 9 thereof. Said recess or cavity 9 is adapted for association with the annular fin or web 4 of the inner wheel member, and for bearing engagement with the series of friction rollers 5 carried by said web or fin as shown, and the arrangement is such that all lateral motion between the inner and outer wheel members is prevented, while a limited free eccentric motion between said members is permitted.

In the preferred form of the present invention, the series of friction rollers 5, have a staggered relation to each other, as illustrated in Fig. 3, so that one-half of the series will be individual to one side wall of the aforesaid annular recess 10, while the other half of the series will be individual to the other side wall of said recess.

In order to attain an assemblage of the wheel parts, the outer annular member 7 is preferably formed in two circular portions, which are fixedly connected together by a series of rivets or bolts 11, as illustrated in Figs. 1 and 2.

It is within the scope of the present invention to reverse the arrangement of the structural details of the engaging parts of the wheel structure, so that the series of friction rollers 5' will be carried by the annular outer member 7', while the annular recess or cavity 10' will be formed in the periphery of the rim 3', of the inner wheel member, as illustrated in Fig. 4.

In the operation of the present invention, the perimeter of the inner wheel member rolls upon the inner circular face of the outer annular member 7, so that when irregularities in the roadway cause a partial stoppage of the ordinary rolling movement of the outer wheel member along the roadway, the inner wheel member will tend to ride upward and forward upon said outer wheel member against the gravity stress of said inner wheel member and the load carried thereon. In consequence the transference of sudden jars from the outer wheel member to the inner wheel member and the vehicle body carried thereon is very effectively avoided.

Having thus fully described my said invention what I claim as new and desire to secure by Letters Patent, is:—

1. In a vehicle wheel, the combination of an inner wheel member, and an outer tread member having an internal diameter greater than the peripheral diameter of the inner wheel member, one member having a series of radially disposed rollers and the other member having an annular recess for operative engagement with said rollers, substantially as set forth.

2. In a vehicle wheel, the combination of an inner wheel member, and an outer tread member having an internal diameter greater than the peripheral diameter of the inner wheel member, one member having a central annular fin and a series of radially disposed rollers journaled in said fin, and the other member having an annular recess for operative engagement with said rollers, substantially as set forth.

3. In a vehicle wheel the combination of an inner wheel member, and an outer tread member having an internal diameter greater than the peripheral diameter of the inner wheel member, one member having a central annular fin and a series of radially disposed rollers journaled in staggered relation in said fin, and the other member having an annular recess for operative engagement with said rollers, substantially as set forth.

4. In a vehicle wheel, the combination of an inner wheel member provided with a series of radially disposed rollers on its periphery, and an outer annular tread member, the internal diameter of which is greater than the peripheral diameter of the inner wheel member, and formed with an annular recess in its inner face for operative engagement with the series of rollers aforesaid, substantially as set forth.

5. In a vehicle wheel, the combination of an inner wheel member provided with a series of radially disposed rollers on its periphery, and an outer annular tread member, the internal diameter of which is greater than the peripheral diameter of the inner wheel member, and formed with an annular recess in its inner face for operative engagement with the series of rollers aforesaid, the series of rollers having a staggered relation, substantially as set forth.

6. In a vehicle wheel, the combination of an inner wheel member provided with a central annular fin and a series of radially disposed rollers journaled in said fin, and an outer annular tread member, the internal diameter of which is greater than the peripheral diameter of the inner wheel member, and formed with an annular recess in its inner face for operative engagement with the series of rollers aforesaid, substantially as set forth.

7. In a vehicle wheel, the combination of an inner wheel member provided with a central annular fin and a series of radially disposed rollers journaled in said fin, and an outer annular tread member, the internal diameter of which is greater than the peripheral diameter of the inner wheel member, and formed with an annular recess in its inner face for operative engagement with the series of rollers aforesaid, the series of rollers having a staggered relation, substantially as set forth.

Signed at Chicago, Illinois, this 3rd day of December, 1915.

WILLIAM J. BUSSE.